United States Patent [19]

Nakaguchi et al.

[11] Patent Number: 5,264,400
[45] Date of Patent: Nov. 23, 1993

[54] GLASS PANES FOR VEHICLES

[75] Inventors: Kunio Nakaguchi; Takashi Sunada; Yoshikazu Toshikiyo, all of Osaka, Japan

[73] Assignee: Nippon Sheet Glass Co., Ltd., Osaka, Japan

[21] Appl. No.: 959,796

[22] Filed: Oct. 13, 1992

[30] Foreign Application Priority Data

Oct. 11, 1991 [JP] Japan ................... 3-263812

[51] Int. Cl.$^5$ .................. C03C 3/087; C03C 4/10; C03C 4/08
[52] U.S. Cl. ......................... 501/71; 501/64; 501/66; 501/68; 501/69; 501/70; 501/72; 501/904; 501/905; 428/220; 428/337; 428/426; 428/446
[58] Field of Search ............ 501/27, 64, 66, 69, 501/70, 71, 72, 152, 904, 905; 428/220, 337, 426, 446

[56] References Cited

U.S. PATENT DOCUMENTS

| | | | |
|---|---|---|---|
| 4,101,705 | 7/1978 | Fischer et al. ............... | 428/220 |
| 4,104,076 | 8/1978 | Pons ............................ | 501/71 |
| 4,358,542 | 11/1982 | Hares et al. ................. | 501/13 |
| 4,792,536 | 12/1988 | Pecoraro et al. ............. | 501/70 |
| 5,061,659 | 10/1991 | Ciolek et al. ................ | 501/64 |

Primary Examiner—Karl Group
Assistant Examiner—Michael A. Marcheschi
Attorney, Agent, or Firm—Sughrue, Mion, Zinn, Macpeak & Seas

[57] ABSTRACT

Glass for vehicles comprising from 65 to 80% by weight of $SiO_2$, from 0 to 5% by weight of $Al_2O_3$, from 0 to 5% by weight of $B_2O_3$, from 0 to 10% by weight of MgO, from 5 to 15% by weight of CaO, from 10 to 18% by weight of $Na_2O$, from 0 to 5% by weight of $K_2O$, from 5 to 15% by weight in total of MgO and CaO, from 10 to 20% by weight in total of $Na_2O$ and $K_2O$, from 0.1 to 1% by weight of cerium oxide in terms of $CeO_2$, from 0.2 to 0.6% by weight of iron oxide in terms of $Fe_2O_3$, from 0 to 0.005% by weight of CoO, from 0 to 0.01% by weight of NiO, from 0.2 to 3% by weight of $Er_2O_3$, and from 0.0003 to 0.005% by weight of Se. The glass assumes bronze while exhibiting excellent ultraviolet and heat absorption.

3 Claims, No Drawings

GLASS PANES FOR VEHICLES

FIELD OF THE INVENTION

The present invention relates to a glass pane for vehicles, particularly automobiles. More particularly, it relates to bronzed glass for vehicles excellent in ultraviolet and heat rays absorption.

BACKGROUND OF THE INVENTION

Colored glass which has been used as window glass of vehicles includes blue-tinted glass containing $Fe_2O_3$ and CoO, green-tinted glass having a higher $Fe_2O_3$ content than blue-tinted glass to have improved heat rays absorption, and gray-tinted or bronzed glass containing $Fe_2O_3$, CoO, NiO, and Se as colorants.

While blue-tinted and green-tinted glass having a relatively high $Fe_2O_3$ content has relatively high heat and ultraviolet absorbing power, there still is an eagerness to protect interior trim from deterioration due to ultraviolet rays with the recent trend to luxurious trim of automobiles. To cope with this demand, glass having high ultraviolet absorbing power while satisfying the requirements for energy saving has recently been developed. Having a higher $Fe_2O_3$ content than in conventional glass, this glass is also tinted in green.

On the other hand, the conventional gray-tinted or bronzed glass has insufficient ultraviolet and heat rays absorption because of its lower $Fe_2O_3$ content than in the blue-tinted glass and does not satisfy the demand for protection of interior trim from ultraviolet deterioration. Nevertheless, gray-tinted or bronzed glass has been desired from considerations of designs of vehicles. It has therefore been demanded to develop grain-tinted or bronzed glass having high ultraviolet and heat rays absorbing power.

The present inventors previously proposed gray heat-absorbing glass containing tin oxide as a reducing agent and thereby having a high heat rays absorption, but this glass is costly because tin oxide is expensive. The present inventors also proposed glass for vehicles which assumes gray or bronze by using iron oxide, cobalt oxide, nickel oxide, and selenium instead of tin oxide. When these coloring materials are used, however, it has turned out that an attempt to increase a visible light transmission meets difficulty in obtaining a dominant wavelength of 590 nm or more with the CIE standard illuminant C.

SUMMARY OF THE INVENTION

An object of the present invention is to solve the above-mentioned problems associated with the conventional glass for vehicles and to provide bronzed glass which has high ultraviolet and heat rays absorbing power and is suitable for use in vehicles.

Other objects and effects of the present invention will be apparent from the following description.

The present invention relates to glass for vehicles comprising from 65 to 80% by weight of $SiO_2$, from 0 to 5% by weight of $Al_2O_3$, from 0 to 5% by weight of $B_2O_3$, from 0 to 10% by weight of MgO, from 5 to 15% by weight of CaO, from 10 to 18% by weight of $Na_2O$, from 0 to 5% by weight of $K_2O$, from 5 to 15% by weight in total of MgO and CaO, from 10 to 20% by weight in total of $Na_2O$ and $K_2O$, from 0.1 to 1% by weight of cerium oxide in terms of $CeO_2$, from 0.2 to 0.6% by weight of iron oxide in terms of $Fe_2O_3$, from 0 to 0.005% by weight of CoO, from 0 to 0.01% by weight of NiO, from 0.2 to 3% by weight of $Er_2O_3$, and from 0.0003 to 0.005% by weight of Se.

DETAILED DESCRIPTION OF THE INVENTION

In the glass for vehicles of the present invention, the content of $SiO_2$ is preferably from 68 to 73% by weight, the content of $Al_2O_3$ is preferably from 1.0 to 2.5% by weight, the content of $B_2O_3$ is preferably from 0 to 1.0% by weight, the content of MgO is preferably from 2 to 5% by weight, the content of CaO is preferably from 6 to 12% by weight, the content of $Na_2O$ is preferably from 12 to 15% by weight, the content of $K_2O$ is preferably from 0 to 2% by weight, the total content of MgO and CaO is preferably from 8 to 14% by weight, the total content of $Na_2O$ and $K_2O$ is preferably from 12 to 16% by weight, the content of cerium oxide is preferably from 0.3 to 1.0% by weight in terms of $CeO_2$, the total content of iron oxide is preferably from 0.3 to 0.6% by weight in terms of $Fe_2O_3$, the content of CoO is preferably from 0 to 0.003% by weight, the content of NiO is preferably from 0 to 0.005% by weight, the content of $Er_2O_3$ is preferably from 0.3 to 2% by weight, and the content of Se is preferably from 0.0003 to 0.0015% by weight.

The glass for vehicles of the present invention preferably has, with a thickness of 4 mm, a visible light transmission of at least 70% with the CIE standard illuminant A and a dominant wavelength of 570 nm or longer as measured with the CIE standard illuminant C at a viewing angle of 2°.

The glass for vehicles of the present invention more preferably has, with a thickness of 4 mm, a solar radiation transmission of not more than 60%, a light transmission of not more than 10% at a wavelength of 350 nm, and an excitation purity of not more than 10% with the CIE standard illuminant C.

Concerning the contents of the components in the glass, the term "%" used hereinafter is % by weight.

$SiO_2$ forms the skeleton of glass. If its content is less than 65%, the glass has reduced durability. If it exceeds 80%, the composition is difficult to melt.

$Al_2O_3$ serves to improve durability of glass. If its content exceeds 5%, the composition is difficult to melt. A preferred $Al_2O_3$ content is from 0.1 to 2%.

$B_2O_3$ is used, while not essential, for improvement of durability of glass and also as a melting aid. The upper limit of its content is 5%. $B_2O_3$ of higher content interferes with production of flat glass due to volatilization, etc.

MgO and CaO both serve to improve durability of glass and to control liquidus temperature and viscosity at the time of glass forming. If the MgO content exceeds 10%, the liquidus temperature becomes high. If the CaO content is less than 5% or higher than 15%, the liquidus temperature becomes high. If the total content of MgO and CaO is less than 5%, the resulting glass has deteriorated durability. If it exceeds 15%, the liquidus temperature becomes high.

$Na_2O$ and $K_2O$ are used as a glass melting accelerator. If the $Na_2O$ content is less than 10%, or if the total content of $Na_2O$ and $K_2O$ is less than 10%, the effect of accelerating melting is weak. If $Na_2O$ content exceeds 18%, or if the total content of $Na_2O$ and $K_2O$ exceeds 20%, durability is reduced. Since $K_2O$ is more expensive than $Na_2O$, it is used in an amount of 5% at the most.

Cerium oxide is present in glass as $CeO_2$ and $Ce_2O_3$, both of which exhibit ultraviolet absorbing power. If the cerium oxide content in terms of a $CeO_2$ content is less than 0.1%, the ultraviolet absorbing effect is weak. If it exceeds 1%, the glass absorbs visible light to reduce the visible light transmission.

Iron oxide is present in glass as $Fe_2O_3$ and FeO. The former absorbs ultraviolet rays, and the latter absorbs heat rays. If the iron oxide content in terms of an $Fe_2O_3$ content is less than 0.2%, the effects of absorbing ultraviolet and heat rays are small. If it exceeds 0.6%, the visible light transmission is unfavorably reduced.

Where iron oxide and cerium oxide coexist in glass, it is known that divalent iron is oxidized to trivalent iron with tetravalent cerium. A decrease of divalent iron leads to a reduction in infrared absorbing power. In order to avoid this, cerium oxide is preferably used at a cerium oxide to iron oxide weight ratio of not more than 1.5.

CoO has an absorption peak at around 600 nm and is therefore used for fine adjustment of the dominant wavelength of glass. If its content exceeds 0.005%, the visible light transmission is reduced.

NiO has an absorption peak at around 450 nm and is also used for fine adjustment of the dominant wavelength of glass. If its content exceeds 0.01%, the visible light transmission is reduced.

$Er_2O_3$ is an essential ingredient for making glass bronzed or gray-tinted. If its content is less than 0.2%, the coloring effect is insubstantial. If it exceeds 3%, the resulting glass is excessively colored to have a reduced visible light transmission.

Se is also an essential component for neutralizing the green color of iron oxide-containing glass to thereby provide bronzed glass. If its content is less than 0.0003%, the color neutralizing effect is insubstantial. If it exceeds 0.005%, the visible light transmission of the resulting glass is unfavorably reduced.

If desired, the glass according to the present invention may further contain the following optional components in addition to the above-mentioned components as long as the effects of the present invention are not impaired. That is, the glass may contain BaO, ZnO, $TiO_2$, or $ZrO_2$ in an amount of up to 1% by weight for the purpose of improving durability. The glass may also contain $Li_2O$ or F as a melting aid in an amount of up to 1% by weight. Further, the glass may contain $SO_3$, $As_2O_3$, $Sb_2O_3$, or Cl as a fining agent in an amount of up to 1% by weight.

The present invention is now illustrated in greater detail by way of Examples and Comparative Example, but it is not understood that the present invention is construed as being limited thereto. All the parts, percents, and the like are by weight unless otherwise indicated.

EXAMPLES 1 TO 9 AND COMPARATIVE EXAMPLE 1

Glass samples having the composition shown in Table 1 below were prepared as follows.

Silica sand, borax, feldspar, limestone, dolomite, soda ash, salt cake, carbon, cerium oxide, red oxide, cobalt oxide, nickel oxide, erbium oxide, and selenium were weighed and mixed to have the composition of Table 1, and the resulting batch was heat-melted in an electric furnace. The molten glass was cast and slowly cooled to room temperature. The cooled and colored glass was cut and polished to prepare a 4 mm thick specimen for determination of optical characteristics.

Optical characteristics of each of the resulting specimens and, for comparison, bronzed glass conventionally employed for vehicles were determined at a viewing angle of 2° using the CIE standard illuminants A and C by means of a self-recording spectrophotometer Model 330, manufactured by Hitachi, Ltd. The results obtained are shown in Table 2 below. The ultraviolet absorption was determined in terms of transmission at a wavelength of 350 nm.

TABLE 1

(Glass Composition)

| Ingredient | Example 1 | Example 2 | Example 3 | Example 4 | Example 5 | Example 6 | Example 7 | Example 8 | Example 9 | Comparative Example 1 |
|---|---|---|---|---|---|---|---|---|---|---|
| $SiO_2$ | 70.77 | 70.88 | 69.58 | 69.22 | 69.77 | 69.27 | 68.77 | 69.90 | 69.40 | 71.26 |
| $B_2O_3$ | 0 | 0 | 1.00 | 0 | 0 | 0 | 0.50 | 0 | 0 | 0 |
| $Al_2O_3$ | 1.50 | 1.50 | 1.50 | 1.50 | 1.50 | 1.50 | 1.50 | 1.50 | 1.50 | 1.52 |
| MgO | 4.00 | 4.00 | 4.00 | 4.00 | 4.00 | 4.00 | 4.00 | 4.00 | 4.00 | 3.85 |
| CaO | 8.00 | 8.00 | 8.00 | 8.00 | 8.00 | 8.00 | 8.00 | 8.00 | 8.00 | 8.92 |
| $Na_2O$ | 13.50 | 13.50 | 13.50 | 13.50 | 13.50 | 13.50 | 13.50 | 13.50 | 13.50 | 13.31 |
| $K_2O$ | 1.00 | 1.00 | 1.00 | 1.00 | 1.00 | 1.00 | 1.00 | 1.00 | 1.00 | 0.90 |
| $CeO_2$ | 0.40 | 0.45 | 0.50 | 0.70 | 0.40 | 0.40 | 0.40 | 0.60 | 0.65 | 0 |
| $Fe_2O_3$ | 0.33 | 0.37 | 0.42 | 0.58 | 0.33 | 0.33 | 0.33 | 0.50 | 0.54 | 0.24 |
| CoO | 0 | 0 | 0 | 0 | 0.0010 | 0 | 0.0010 | 0 | 0 | 0.0007 |
| NiO | 0 | 0 | 0 | 0 | 0.0020 | 0 | 0.0020 | 0 | 0 | 0.0035 |
| $Er_2O_3$ | 0.50 | 0.30 | 0.50 | 1.50 | 1.50 | 2.00 | 2.00 | 1.0 | 1.5 | 0 |
| Se | 0.0013 | 0.0010 | 0.0008 | 0.0005 | 0.0006 | 0.0006 | 0.0006 | 0.0008 | 0.0005 | 0.0006 |

TABLE 2

(Optical Characteristics)

| | | Example 1 | Example 2 | Example 3 | Example 4 | Example 5 | Example 6 | Example 7 | Example 8 | Example 9 | Comparative Example 1 |
|---|---|---|---|---|---|---|---|---|---|---|---|
| $T_G^{(1)}$ | (%) | 59.3 | 58.2 | 56.3 | 48.8 | 59.0 | 59.5 | 58.4 | 51.5 | 50.2 | 69.0 |
| $Y_A^{(2)}$ | (%) | 70.7 | 72.5 | 72.7 | 70.1 | 70.4 | 73.3 | 70.0 | 70.1 | 70.3 | 77.0 |
| $\lambda_d^{(3)}$ | (nm) | 581 | 577 | 576 | 581 | 598 | 603 | 616 | 579 | 583 | 576 |
| $P_e^{(4)}$ | (%) | 9.5 | 7.4 | 5.7 | 2.1 | 2.8 | 3.5 | 2.5 | 5.4 | 2.9 | 5.0 |

TABLE 2-continued (Optical Characteristics)

| | Example 1 | Example 2 | Example 3 | Example 4 | Example 5 | Example 6 | Example 7 | Example 8 | Example 9 | Comparative Example 1 |
|---|---|---|---|---|---|---|---|---|---|---|
| $T_{UV}$[5] (%) | 8.6 | 6.1 | 1.9 | 1.5 | 8.0 | 7.9 | 7.8 | 1.8 | 1.6 | 47.7 |

Note:
[1]: Solar radiation transmission, measured according to JIS R3208
[2]: Visible light transmission (illuminant A), measured according to JIS Z8701
[3]: Dominant wavelength (illuminant C), measured according to JIS Z8701
[4]: Excitation purity (illuminant C), measured according to JIS Z8701
[5]: Ultraviolet tranmission at 350 nm It can be seen from Tables 1 and 2 that the glass according to the present invention assumes bronze while having a high visible light transmission and a low solar radiation transmission. It is possible to produce glass whose dominant wavelength exceeds 590 nm by the effect of erbium oxide. Thus, the glass of the present invention is suitable for use in not only vehicles but buildings.

While the invention has been described in detail and with reference to specific examples thereof, it will be apparent to one skilled in the art that various changes and modifications can be made therein without departing from the spirit and scope thereof.

What is claimed is:

1. A bronze glass for vehicles comprising:
from 65 to 80% by weight of $SiO_2$;
from 0 to 5% by weight of $Al_2O_3$;
from 0 to 5% by weight of $B_2O_3$;
from 0 to 10% by weight of MgO;
from 5 to 15% by weight of CaO;
from 10 to 18% by weight of $Na_2O$;
from 0 to 5% by weight of $K_2O$;
from 5 to 15% by weight in total of MgO and CaO;
from 10 to 20% by weight in total of $Na_2O$ and $K_2O$;
from 0.1 to 1% by weight of cerium oxide in terms of $CeO_2$;
from 0.2 to 0.6% by weight of iron oxide in terms of $Fe_2O_3$;
from 0 to 0.005% by weight of CoO;
from 0 to 0.01% by weight of NiO;
from 0.2 to 3% by weight of $Er_2O_3$;
and from 0.0003 to 0.005% by weight of Se; wherein said glass with a thickness of 4 mm has a visible light transmission of at least 70% with the CIE standard illuminant A and a dominant wavelength of 590 nm or longer with the CIE standard illuminant C.

2. Glass for vehicles as claimed in claim 1, wherein the cerium oxide and iron oxide are present at a weight ratio of not more than 1.5.

3. Glass for vehicles as claimed in claim 2, wherein the glass with a thickness of 4 mm has a solar radiation transmission of not more than 60% and an ultraviolet light transmission of not more than 10% at a wavelength of 350 nm.

* * * * *